United States Patent
Miller et al.

(10) Patent No.: US 6,831,555 B1
(45) Date of Patent: Dec. 14, 2004

(54) METHOD AND APPARATUS FOR DYNAMICALLY MONITORING SYSTEM COMPONENTS IN AN ADVANCED PROCESS CONTROL (APC) FRAMEWORK

(75) Inventors: Michael Lee Miller, Cedar Park, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 321 days.

(21) Appl. No.: 10/090,692

(22) Filed: Mar. 5, 2002

(51) Int. Cl.⁷ .............................................. G08B 29/00
(52) U.S. Cl. .................. 340/506; 340/516; 340/3.1; 340/3.21; 700/176; 700/121
(58) Field of Search ................. 340/506, 516, 340/3.1, 3.21; 700/176, 121

(56) References Cited

U.S. PATENT DOCUMENTS 6,469,518 B1 * 10/2002 Davis et al. ................ 324/600

* cited by examiner

*Primary Examiner*—Daryl C. Pope
(74) *Attorney, Agent, or Firm*—Williams, Morgan & Amerson

(57) ABSTRACT

A method and system for monitoring a performance of at least one system component of a manufacturing system. At least one event that can occur within the system is defined. It is determined whether the at least one event has occurred within the system, and altering a frequency at which the at least one system component is monitored providing the at least one event has occurred within the system.

19 Claims, 3 Drawing Sheets

METHOD AND APPARATUS FOR DYNAMICALLY MONITORING SYSTEM COMPONENTS IN AN ADVANCED PROCESS CONTROL (APC) FRAMEWORK

BACKGROUND OF THE INVENTION

1. Field of the Invention

This invention relates generally to computer system monitoring, and, more particularly, to a method and apparatus for dynamically monitoring system components based upon the occurrence of system events in an advanced process control (APC) framework of a semiconductor manufacturing environment.

2. Description of the Related Art

There is a constant drive in the semiconductor industry to increase the quality, reliability, and throughput of integrated circuit devices such as microprocessors, memory devices, and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing the defects in the manufacture of these devices lowers the cost of the devices themselves. Accordingly, the cost of the final product incorporating these devices is also reduced, providing inherent monetary benefits to both the consumer and manufacturer.

To improve the quality of the manufactured semiconductor devices, and to reduce the operational costs associated therewith, monitoring of various system components within the manufacturing system is usually performed to ensure that these components are operating properly. Typically, the components of the manufacturing system are monitored on a periodic basis, such as hourly, which is statically defined by the system. Certain events, however, may occur within the manufacturing system, which may lead to at least a temporary instability of the affected system components upon the occurrence of these events. For example, the event may be the detection of a fault condition with a particular system component or a system restart. Because the system's components may be more prone to experiencing problems during the occurrence of these events, any significant delay in monitoring these components may adversely impact the quality and cost of the manufactured semiconductor devices.

The present invention is directed to overcoming, or at least reducing the effects of, one or more of the problems set forth above.

SUMMARY OF THE INVENTION

In one aspect of the present invention, a method for monitoring a performance of at least one system component of a manufacturing system is provided. The method comprises defining at least one event that can occur within the system and determining whether the at least one event has occurred within the system. The method further comprises altering a frequency at which the at least one system component is monitored providing the at least one event has occurred within the system.

In another aspect of the present invention, a system is provided. The system comprises at least one system component and a monitoring unit. The monitoring unit is adapted to monitor the performance of the at least one system component, determine whether at least one predefined event has occurred within the system, and alter a frequency at which the at least one system component is monitored providing the at least one event has occurred within the system.

BRIEF DESCRIPTION OF THE DRAWINGS

The invention may be understood by reference to the following description taken in conjunction with the accompanying drawings, in which like reference numerals identify like elements, and in which.

Figure 1:
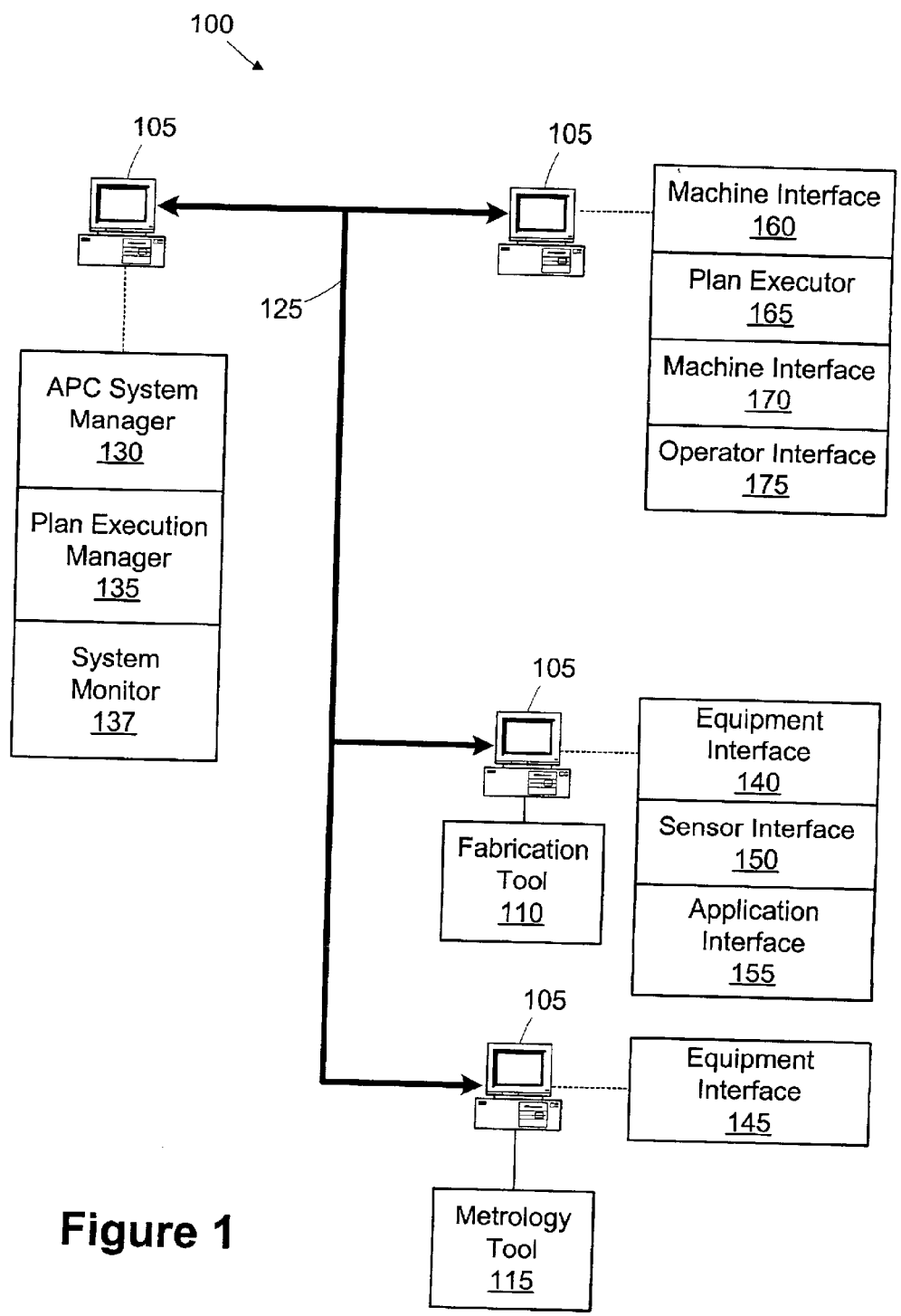
FIG. 1 is a simplified block diagram of an advanced process control (APC) system including a system monitor in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of an advanced process control (APC) system 100 is shown in accordance with one embodiment of the present invention. The APC system 100 includes a distributed software system of interchangeable, standardized software components permitting run-to-run control and fault detection of a semiconductor fabrication environment according to the illustrated embodiment. The software components implement an architectural standard based on the Semiconductor Equipment and Materials International (SEMI) Computer Integrated Manufacturing (CIM) Framework compliant system technologies and the Advanced Process Control (APC) Framework. CIM (SEMI E81-0699—Provisional Specification for CIM Framework Domain Architecture) and APC (SEMI E93-0999—Provisional Specification for CEM Framework Advanced Process Control Component) specifications are publicly available from SEMI. This particular architecture relies on software utilizing object-oriented programming and employs the Object Management Group's (OMG) Common Object Request Broker Architecture (CORBA) and CORBA Services specifications for distributed object systems. Information and specifications for the OMG CORBA architecture are also publicly available. An exemplary software system capable of performing the functions of the APC system 100, as described herein, is the ObjectSpace Catalyst system provided by ObjectSpace, Inc.

The components within the APC system 100 communicate with each other using CORBA and rely on a common set of services to support their interaction. Standard interfaces may be defined according to an object-oriented, remote invocation communications model. These interfaces and all APC communications are defined using IDL (Interface Definition Language). Components communicate by invoking operations on each other's interfaces, and data is passed between the components of the system 100 as operation parameters and return values.

A standard set of distributed-object services are defined by OMG. One such service defined by OMG is an Event Service, which supports asynchronous communications between the components of the APC system 100. Many of the APC components create "events" as they change state, and these events are received by interested event subscribers within the system 100. Examples of event usage within the APC system 100 may include, but are not necessarily limited to, a communication component state, a notification of a fault alarm detected by fault detection software, and a reporting of tool status ascertained from collected data. The aforementioned OMG Event Service is well established in the art. OMG's CORBA/IIOP Specifications and CORBA Services Specifications documents are widely distributed among those in the art and provide greater detail.

According to one embodiment of the present invention, the APC system 100 is adapted to control a semiconductor manufacturing environment. The components of the APC system 100 communicate with each other via CORBA Interface Definition Language (IDL) interfaces, as previously discussed. The cooperating software components may manage process control plans or strategies, and collect data from process tools, metrology tools, and add-on sensors. They may also invoke various process control applications or algorithms based upon the collected data, and update process models and modify tool operating recipe parameters, as deemed appropriate.

According to one embodiment, the APC system 100 includes a plurality of host computers 105, a fabrication tool 110, and a metrology tool 115. The components of the APC system 100 are interconnected by a data communications bus 125. The overall operation of the APC system 100 is directed by an APC system manager 130 that is resident on one of the APC host computers 105. The APC system manager 130 provides administrative, configuration, event, and state services for all servers developed for the APC Framework; definition, grouping, installation, and management of the components in the APC system 100; centralized services for capturing activity and trace information for diagnostic and monitoring purposes; a centralized repository of component configuration information, including setup values, system environment settings; and lists of dependent objects and event channels. In alternative embodiments, these functions may be divided into one or more software components, e.g., a base manager, a system manager, a logger, a registry, and the like.

The APC system 100 includes a network of processing modules, which are referred to as "integration components."

Integration components serve as interfaces to existing factory systems and provide capabilities for running APC Plans. An "APC Plan" is an application program called to perform some specific task, as is discussed in more detail below. The integration components are shown as they might be hosted by the various processing resources within the APC system 100. These specific hosting locations are provided for exemplary purposes. The processing resources are interconnected, and the various software components may be either distributed among the various computers or centralized, depending on the complexity of the system. The integration components include, but are not limited to, the APC system manager 130; a plan execution manager 135; a system monitor 137; equipment interfaces 140, 145 associated with the tools 110, 115; a sensor interface 150 associated with the fabrication tool 110; an application interface 155; machine interfaces 160, 170; and an operator interface 175.

Each of the integration components in this particular embodiment are software-implemented, and are programmed in C++ using object-oriented programming techniques as known to those of ordinary skill in the art. An advantage of the APC system 100 is its modular structure, which provides portability of software components.

The plan execution manager 135 is the component primarily responsible for "choreographing" the operation of the APC system 100. The plan execution manager 135 interprets APC plans, executes main scripts and subscripts, and invokes event scripts as events dictate. A variety of plans, scripts, and subscripts may be used in various implementations. The specific number and function of various plans, scripts, and subscripts are implementation specific. For instance, the present embodiment includes, but is not limited to, the following plans:

a data collection plan—a data structure used by sensor and machine interfaces defining the requirements for what data should be collected from a specific processing equipment, and how that data should be reported back;

a duration plan—a plan that defines trigger conditions and trigger delays that cause sensors to act, e.g., start data collection, stop data collection;

a reporting plan—a plan that defines what to do with the collected data, as well as when to signal the data's availability; and a sampling plan—a plan that defines the frequency at which the data is to be collected by an external sensor.

The plan execution manager 135 coordinates the execution of user-defined process control plans among all the integration components for a given fabrication tool, such as the fabrication tool 110. When instructed, the plan execution manager 135 retrieves a plan and its associated scripts. It preprocesses subscripts to provide routines to main and event scripts. It also obtains a list of the capabilities necessary to execute the plan, as specified in the plan, and connects to the proper integration components providing the required capabilities.

The plan execution manager 135 then delegates responsibility to run the plan to a plan executor 165. In the illustrated embodiment, the plan executor 165 is created by the plan execution manager 135 to sequentially execute the plan and report completion of the plan or errors in the execution of the plan to the plan execution manager 135. Thus, while the plan execution manager 135 is responsible for the overall management of all plans executed, each plan executor 165 is responsible for running only one plan. The plan executor 165 usually exists for the life of the plan and is deleted by the plan execution manager 135 after reporting that the plan is completed or aborted. Each plan executor 165 executes a main script and sometimes one or more event scripts. The plan execution manager 135 may start multiple plans concurrently via multiple plan executors.

The machine interfaces 160, 170 bridge communication between the APC framework, e.g., the APC system manager 130 and the equipment interfaces 140, 145. The machine interfaces 160, 170 interface the processing or metrology tools 110, 115 with the APC framework and support machine setup, activation, monitoring, and data collection. In this particular embodiment, the machine interfaces 160, 170 primarily translate between specific communications of the equipment interfaces 140, 145 and CORBA communications of the APC framework. More particularly, the machine interfaces 160, 170 receive commands, status events, and collected data from the equipment interfaces 140, 145 and forward as needed to other APC components and event channels. In turn, responses from other APC components are received by the machine interfaces 160, 170 and routed to the equipment interfaces 140, 145. The machine interfaces 160, 170 also reformat and restructure messages and data as necessary. The machine interfaces 160, 170 support the startup/shutdown procedures within the APC System Manager 130. They also serve as APC data collectors, buffering data collected by the equipment interfaces 140, 145 and emitting appropriate data collection events.

The sensor interface 150 collects data generated by the sensors monitoring the operation of the fabrication tool 110. The sensor interface 150 provides the appropriate interface environment to communicate with external sensors, such as LabVIEW® or other sensor, bus-based data acquisition software. The application interface 155 provides the appropriate interface environment to execute control plug-in applications such as LabVIEW, Mathematica, ModelWare, MatLab, Simca 4000, and Excel. The sensors may be supplied with the fabrication tool 110 by the original equipment manufacturer (OEM) or they may be "add-on" sensors installed subsequent to acquisition from the OEM. The sensor interface 150 collects data generated by add-on sensors and the application interface 155 collects data generated by OEM sensors. The sensors may generate data on, for example, the pressure and temperature of the operating conditions during the processing of the silicon wafer. The machine interface 160, the application interface 155, and the sensor interface 150 use a common set of functionality to collect data to be used.

An operator interface 175 facilitates communication between a wafer fabrication technician and the APC system 100 via a graphical user interface (GUI) (not shown). The GUI may be a Windows® or Unix-based operating system. However, this is not necessary to the practice of the invention. Indeed, some alternative embodiments might not even employ a GUI and may communicate through a disk operating system (DOS) based operating system. The operator interface 175 displays dialogue boxes to provide information, request guidance and collect additional data. Through a CORBA interface, the operator interface 175 component allows technicians to display a variety of popup dialogs simultaneously on any number of display groups.

In the particular embodiment illustrated, the APC system 100 is a factory-wide software system, but this is not necessary to the practice of the invention. It will be appreciated that the control strategies taught by the present invention may be applied to virtually any semiconductor fabrication tool on a factory floor. Indeed, the present invention may be simultaneously employed on multiple fabrication tools in the same factory or in the same fabrication process. The APC framework permits remote access and monitoring of the process performance. Furthermore, by utilizing the APC framework, data storage can be more convenient, more flexible, and less expensive than with local drives. However, the invention may be employed, in some alternative embodiments, on local drives.

The system monitor 137 typically communicates with the components of the system 100 on a predefined periodic basis, which may be on an hourly basis, for example. Generally, the system monitor 137 will send a signal to these various components during the predefined periodic interval to have them perform a predefined internal diagnostic test to determine if the system components are operating properly within the system 100. When the system 100 experiences a particular event, such as an alarm condition via fault detection software, for example, and the fault is subsequently cleared, the system monitor 137 is typically configured to monitor the component over the same predefined periodic basis even though the monitoring of this component is critical soon after its fault condition has cleared. In accordance with one embodiment of the present invention, the frequency in which the component is monitored by the system monitor 137 may be increased for at least a set period following the occurrence of the system event such that any other potential problems that may be encountered by the component may be identified by the system monitor 137 in a more expedient manner.

Figure 2:
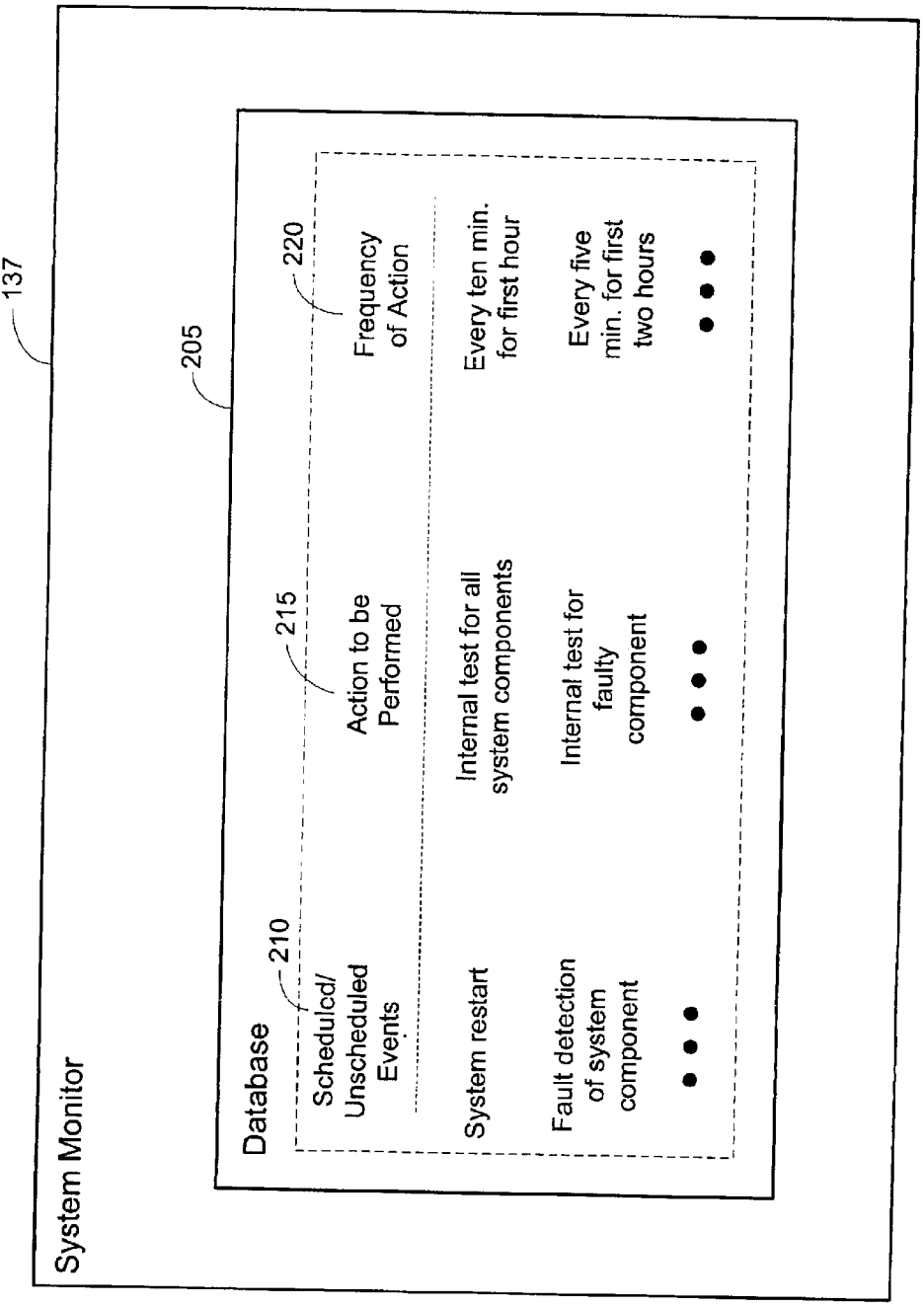
FIG. 2 is a more detailed representation of the system monitor of the advanced process control (APC) system of FIG. 1.

Turning now to FIG. 2, a more detailed representation of the system monitor 137 is provided in accordance with one embodiment of the present invention. In this particular embodiment, the system monitor 137 is provided with a database 205 for storing a list of system events 210, a predefined action 215 to be performed by the system monitor 137 upon occurrence of a corresponding system event 210, and the frequency 220 in which the predefined action 315 is to be performed by the system monitor 137. According to one embodiment, the occurrence of the system events 210 may be scheduled or unscheduled. For example, a restart of the system 100 may be considered a scheduled event (i.e., previously known). On the other hand, an alarm condition for a particular component of the system 100 that was produced by fault detection software, for example, would be considered an unscheduled event (i.e., its occurrence was not previously known).

In the event of a system restart, for example, the predefined action 215 to be performed by the system monitor 137 may be defined as instructing all of the components of the system 100 to perform an internal diagnostic test to determine whether the components are operating properly within the system 100. This particular predefined action 215 may instruct the components to perform this internal diagnostic test at a frequency 220 of, for example, every ten minutes for the first hour since the system 100 has been restarted, and then to subsequently perform the test once an hour thereafter. In the event that the fault detection software detects a fault condition with one of the system components, the system monitor 137 may be configured to instruct the affected system component to run an internal diagnostic test every five minutes for the first two hours once the fault is cleared on the affected system component. Additionally, depending on the type of the system event 210 that has occurred, the predefined action 215 associated with the system event 210 may be to perform a more comprehensive test and/or to perform additional tests that under ordinary circumstances would not be deemed appropriate by the system monitor 137. Additionally, the frequency 220 at which the system monitor 137 monitors the system component(s) may be higher or lower than the aforementioned examples without departing from the spirit and scope of the present invention.

Because the system 100 may be considered more prone to having problems with its components during certain scheduled or unscheduled events such as system restarts and/or fault condition detection, increasing the frequency at which the system components are monitored may increase the likelihood that any further potential problems encountered by these components will be discovered by the system monitor 137 in a more expedient manner. Accordingly, if a problem with a particular system component is discovered by the system monitor 137 in a more expedient manner, the number of faulty wafers that may be produced by the fabrication tool 110 as a result of the discovered problem may be significantly reduced.

It will be appreciated that several different types of system events 210, whether scheduled or unscheduled, may be defined within the database 205 either in addition to or in lieu of the aforementioned examples without departing from the spirit and scope of the present invention. It will further be appreciated that the predefined action 215 to be performed by the system monitor 137, and the frequency 220 in which the predefined action 215 is to occur, may vary, depending on the type of system event 210. It will also be appreciated that the list of system events 210 stored within the database 205, their associated predefined actions 215 to be performed by the system monitor 137, and the frequency 220 of occurrence of the predefined action 215 may be modified by a technician via the operator interface 175.

In accordance with another embodiment of the present invention, the predefined action 215 and frequency 220 of occurrence of the predefined action 215 may be omitted from the database 205, and the system monitor 137 may be alternatively configured to increase the number of monitoring sessions during the occurrence of one of the system events 210 stored within the database 205 for a set period of time. That is, if the system monitor 137 would ordinarily monitor a particular component within the system 100 on an hourly basis, the system monitor 137 may be configured to increase the frequency of such monitoring during a set time period after the occurrence of one of the system events 210 stored within the database. For example, if an event such as restarting the system 100 occurs, and the system components are monitored under ordinary circumstances every hour, the system monitor 137 may be configured to automatically increase the frequency at which these components of the system 100 are monitored by the system monitor 137 to a predefined monitor rate of eight minutes for a set period of one and one-half hours since the occurrence of the system restart, and then to resume a normal monitoring mode (e.g., once an hour) after the expiration of the preset period. It will again be appreciated that the increase in the aforementioned monitor rate for the predefined set period of time in this embodiment may vary, and, thus, need not necessarily be limited to the aforementioned examples.

Figure 3:
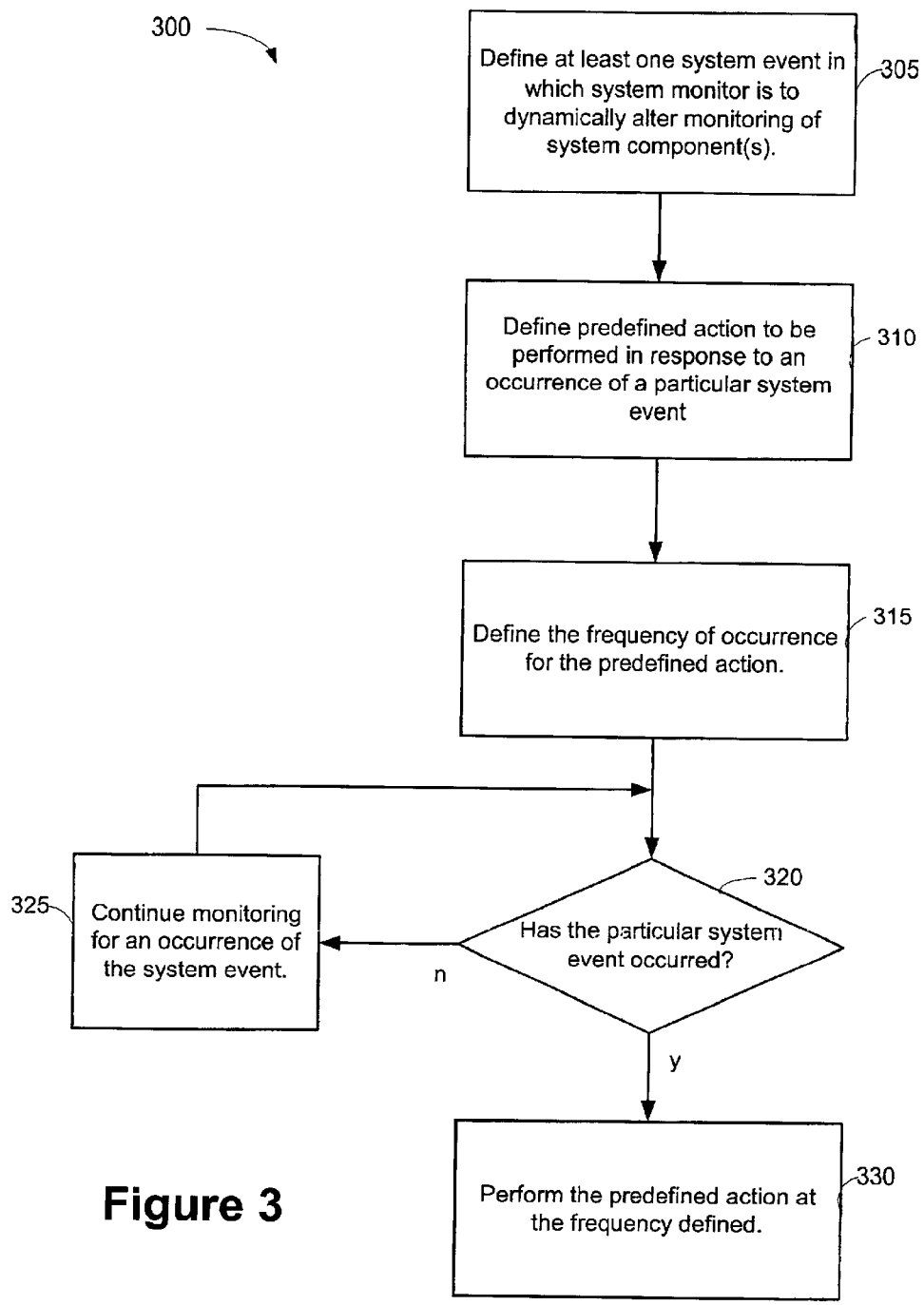
FIG. 3 illustrates a process for dynamically monitoring of components within the advanced process control (APC) system by the system monitor of FIG. 2.

Turning now to FIG. 3, a process 300 for dynamically monitoring the components of the system 100 by the system monitor 137 is provided in accordance with one embodiment of the present invention. The process 300 commences at block 305 where at least one system event in which the system monitor 137 is to dynamically alter the monitoring of a system component or components is defined in the database 205. The occurrence of the system event defined in the database 205 may be scheduled or unscheduled by the system 100. For example, the occurrence of the system event may be considered scheduled if the system event is defined as restarting the system 100 from a previous shutdown. An unscheduled event, on the other hand, may be the detection of a particular fault of a system component by fault detection software. It will be appreciated that several other scheduled or unscheduled events may be defined in the database 205, either in addition to, or in lieu of, the examples provided in which it is desirable for the system monitor 137 to dynamically alter its monitoring of the system component upon occurrence of the particular system event.

At block 310, a predefined action that is to be performed by the system monitor 137 upon occurrence of a particular system event is associated therewith in the database 205. In one embodiment, the predefined action may be for the system monitor 137 to instruct the system component(s) that were affected by the system event to perform a particular internal diagnostic test to determine whether the system component(s) is operating properly within the system 100. In another embodiment, the predefined action may be to have the system monitor 137 instruct the affected system components to perform a more comprehensive test and/or additional tests that would have ordinarily not been deemed appropriate by the system monitor 137 if the system event had not occurred.

Proceeding to block 315, a frequency of occurrence is associated with each predetermined action in the database 205 to indicate to the system monitor 137 as to how frequently it is to perform the predetermined action in response to the occurrence of the system event defined therein. The frequency of occurrence may indicate a predefined periodic interval in which the system monitor 137 is to perform the predefined action, such as every ten minutes, for example. It will be appreciated that the frequency of occurrence of the predetermined action by the system monitor 137 may vary, and, thus need not necessarily be limited to the aforementioned example. It will further be appreciated that the frequency of occurrence may be applicable for a preset period of time following the occurrence of a system event. For example, the frequency at which the system monitor 137 performs the predetermined action may be every ten minutes within a one hour period following the occurrence of the system event. Following the expiration of the one hour period, for example, the system monitor 137 may be configured to resume its usual monitoring frequency of the system component(s).

The process 300 proceeds to block 320 where it is determined whether a particular system event, as defined in the database 205, has occurred. In one embodiment, the occurrence of a particular system event may be reported by fault detection software, for example. If it is determined that a particular system event defined within the database 205 has not occurred, then the monitoring of the system 100 is continued at block 325 until the occurrence of a particular system event defined in the database 205 has been detected. If, however, it has been determined that a system event defined in the database 205 has occurred, then the system monitor 137 performs the predefined action for the particular system event that has occurred at the frequency defined in the database 205 at block 330.

Accordingly, because the system 100 may be considered more prone to having problems with its components during certain scheduled or unscheduled events such as system restarts and/or fault condition detection, by dynamically increasing the frequency in which the system components are monitored may increase the likelihood that any further potential problems encountered by these components will be discovered by the system monitor 137 in a more expedient manner. Therefore, if a problem with a particular system component is discovered by the system monitor 137 in a more expedient manner, the number of faulty wafers that may be produced by the fabrication tool 110 as a result of the discovered problem may be significantly reduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for monitoring a performance of at least one system component of a manufacturing system, comprising:
   determining whether the manufacturing system has been restarted from a previous shutdown of the system; and
   altering a frequency at which the at least one system component is monitored in response to determining that the manufacturing system has been restarted from a previous shutdown of the system.

2. The method of claim 1, wherein altering a frequency at which the at least one system component is monitored further comprises:
   increasing the frequency in which the at least one system component is monitored in response to determining that the manufacturing system has been restarted from a previous shutdown of the system.

3. The method of claim 1, wherein altering a frequency at which the at least one system component is monitored further comprises:
   altering a frequency at which the at least one system component is monitored for a preset time period following the occurrence of the manufacturing system being restarted from a previous shutdown of the system.

4. The method of claim 1, wherein defying at least one event that can occur within the system further comprises:
   defining at least one event as restarting the manufacturing system from a previous shutdown of the system.

5. The method of claim 1, wherein defining at least one event that can occur within the system further comprises:
   defining at least one event as a fault condition occurring with the at least one system component.

6. The method of claim 1, wherein altering a frequency at which the at least one system component is monitored further comprises:
   causing the at least one system component to run a diagnostic test periodically at a first predefined periodic interval as opposed to a second predefined periodic interval, the first predefined periodic interval being shorter than the second predefined periodic interval.

7. The method of claim 1, further comprising:
   defining a predefined action to be performed in response to the occurrence of the manufacturing system being restarted from a previous shutdown of the system.

8. The method of claim 7, further comprising:
   defining a frequency of occurrence for the predefined action.

9. A method for monitoring a performance of at least one system component of a manufacturing system, comprising:
   defining at least one event that can occur within the system;
   determining whether the at least one event has occurred within the system;
   altering a frequency at which the at least one system component is monitored providing the at least one event has occurred within the system;
   defining a predefined action to be performed in response to the occurrence of the at least one event; and
   defining at least one diagnostic test to be performed by the at least one system component in response to the occurrence of the at least one event.

10. A manufacturing system, comprising:
    at least one system component; and
    a monitoring unit adapted to monitor the performance of the at least one system component, determine whether the manufacturing system has been restarted from a previous shutdown of the system, and alter a frequency at which the at least one system component is monitored in response to determining that the manufacturing system has been restarted from a previous shutdown of the system.

11. The system of claim 10, wherein the monitoring unit is further adapted to increase the frequency in which the at least one system component is monitored in response to determining that the manufacturing system has been restarted from a previous shutdown of the system.

12. The system of claim 10, wherein the monitoring unit is further adapted to alter the frequency at which the at least one system component is monitored for a preset time period following the occurrence of the manufacturing system being restarted from a previous shutdown of the system.

13. The system of claim 10, wherein the monitoring unit is further adapted to define at least one event as restarting the manufacturing system from a previous shutdown of the system.

14. The system of claim 10, wherein the monitoring unit is further adapted to define at least one event as a fault condition occurring with the at least one system component.

15. The system of claim 10, wherein the monitoring unit is further adapted to cause the at least one system component to run a diagnostic test periodically at a first predefined periodic interval as opposed to a second predefined periodic interval, the fist predefined periodic interval being shorter than the second predefined periodic interval.

16. The system of claim 10, wherein the monitoring unit is further adapted to define a predefined action to be performed in response to the occurrence of the manufacturing system being restarted from a previous shutdown of the system.

17. The system of claim 16, wherein the monitoring unit is further adapted to define a frequency of occurrence for the predefined action.

18. The system of claim 16, wherein the monitoring unit is further adapted to define at least one diagnostic test to be performed by the at least one system component in response to the occurrence of the manufacturing system being restarted from a previous shutdown of the system.

19. A system for monitoring a performance of at least one system component of a manufacturing system, comprising:
    means for determining whether the manufacturing system has been restarted from a previous shutdown of the system; and
    means for altering a frequency at which the at least one system component is monitored in response to determining that the manufacturing system has been restarted from a previous shutdown of the system.

* * * * *